INVENTORS
LAWRENCE G. MARGULIS
EARL A. ZANGER, JR.
BY
ATTORNEYS

INVENTORS
LAWRENCE G. MARGULIS
EARL A. ZANGER, JR.
BY
ATTORNEYS

May 25, 1965   L. G. MARGULIS ETAL   3,185,927
PROBE INSTRUMENT FOR INSPECTING SEMICONDUCTOR WAFERS
INCLUDING MEANS FOR MARKING DEFECTIVE ZONES
Filed Jan. 31, 1961   7 Sheets-Sheet 6
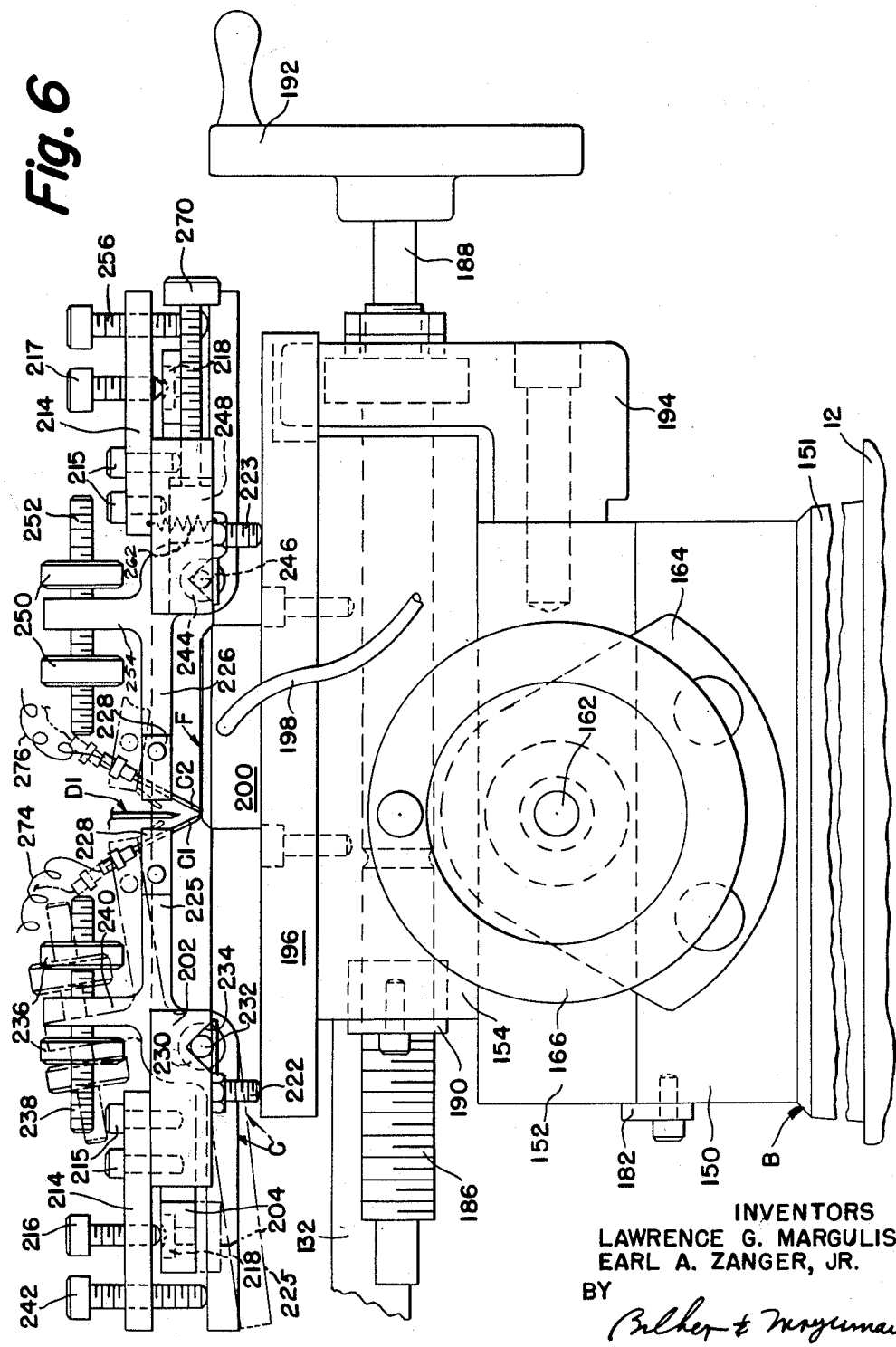
INVENTORS
LAWRENCE G. MARGULIS
EARL A. ZANGER, JR.
BY
ATTORNEYS

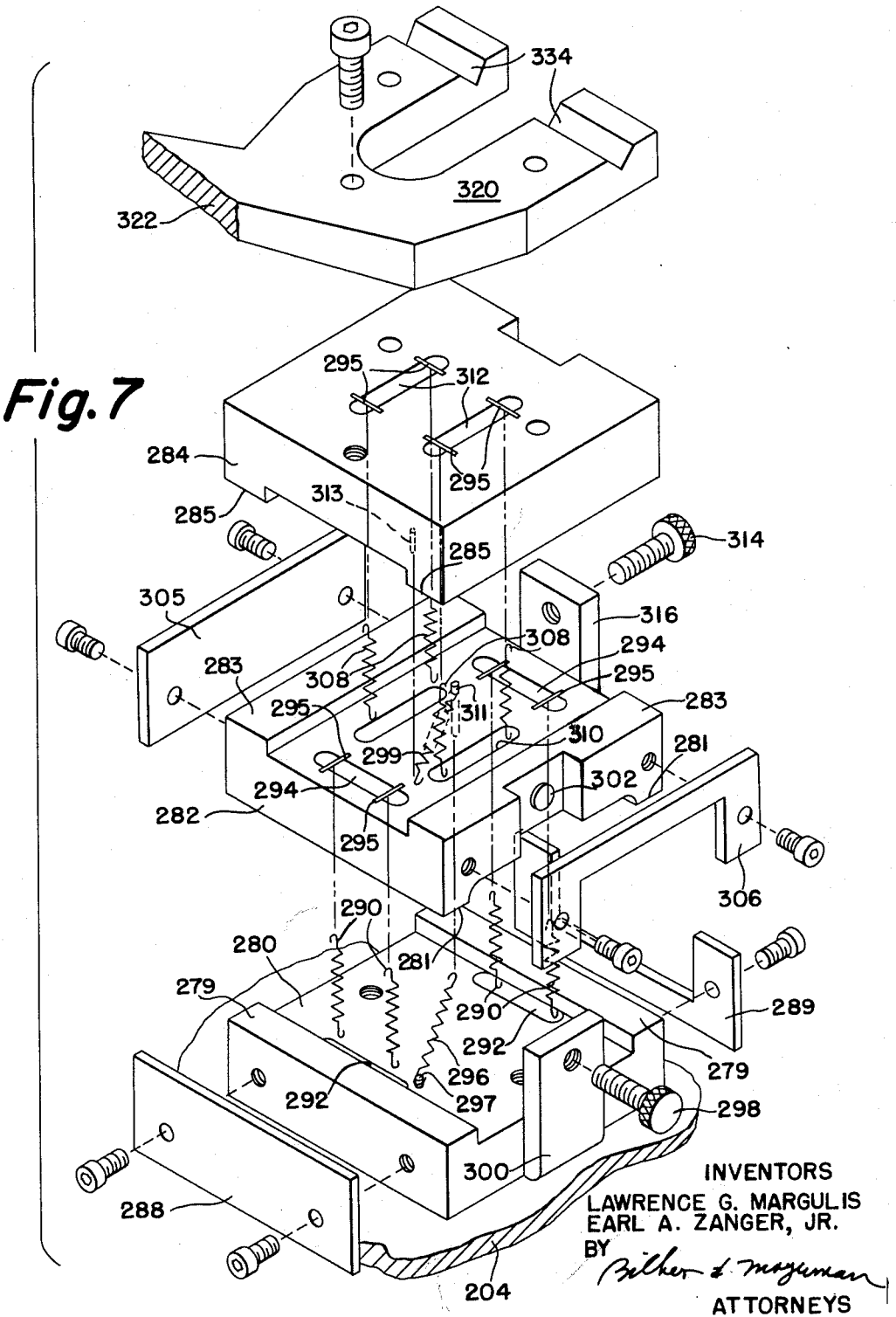

United States Patent Office 3,185,927
Patented May 25, 1965

3,185,927
PROBE INSTRUMENT FOR INSPECTING SEMICONDUCTOR WAFERS INCLUDING MEANS FOR MARKING DEFECTIVE ZONES
Lawrence G. Margulis and Earl A. Zanger, Jr., Philadelphia, Pa., assignors to Kulicke & Soffa Mfg. Co., Philadelphia, Pa., a corporation of Pennsylvania
Filed Jan. 31, 1961, Ser. No. 86,165
27 Claims. (Cl. 324—158)

This invention relates to a production probe instrument for printed semi-conductor wafers, and more particularly relates to a non-destructive testing mechanism for manipulatively probing semi-conductor wafer slabs having a plurality of regularly disposed individual indicia thereon whereby the electrical characteristics of the individual chips or components can be measured and inspected prior to dicing.

In the manufacture of mesa type transistors, a great many control tests and inspections are performed throughout the operations during and from the growth of the crystal to the fabrication of the final transistor assembly. For example, after the crystal is grown, not only are resistivity measurements at the crystal made, but also dislocation measurements and orientation inspections as well. After the wafer has been sliced, but before lapping and polishing thereof, it is then necessary to take resistivity measurements of the slices to insure uniformity of characteristics for the operations subsequently to be performed. A flatness test is conducted before the first and second diffusions of the wafer slices whereupon the cleanuplapping of the slices occurs preliminary to vacuum evaporation.

During the vacuum evaporation, the wafer slices have a plurality of printed indicia disposed thereon usually in the form of short stripes, concentric circles, or "bulls eyes" and generally regularly oriented in accurately defined rows and files. Thereafter, the slices are alloyed and mesa etched prior to scribing or scoring the slices intermediate the printed indicia so that individual dices or chips may be formed preparatory to bonding the semi-conductor elements upon headers or micro-modules. The printed indicia become surface electrodes to which fine wire whiskers are secured in order to translate the semi-conductor characteristics to external circuitry.

It is with the inspection of the printed electrodes on the wafer slabs prior to dicing that this invention is concerned. That is, it is both desirable and efficient to production to inspect the characteristics of the printed semi-conductor wafers before dicing because of convenience in scanning across a single surface rather than testing individual elements having an area approximately $\frac{1}{64}''$ to $\frac{1}{8}''$ in a side.

The surface electrodes (i.e. stripes, concentric circles, bulls eyes) are, for example, compositions of gold, silver, antimony and/or other elements or alloys which form layers of opposite conductivity in the crystal depending upon the desired characteristics of the finished semi-conductor device. From the minuteness of the overall size of the finished crystal wafers, it is easily apparent that the electrode pairs on the surface of the wafers would be microscopic, and in fact, may range in the neighborhood of a few thousandths of an inch in thickness with adjacent electrodes of a pair separated by approximately the same spacing. On a single wafer slab ultimately destined to be diced, there may be as many as one hundred electrode pairs each of which must be delicately tested for electrical as well as visual characteristics prior to dicing and bonding of the individual chips themselves. In addition, the manner of probing and testing must be rapidly accomplished and with sensitivity and without being destructive of the elements under test. Lastly, it is desirable to provide some means to obliterate defective mesas when the measurement indicates that the element does not meet the prescribed control standard, thereby eliminating the possibility of a defective element from being subsequently bonded to a header or micro-module substrate.

It is, therefore, an object of this invention to provide a high-production, non-destructive testing instrument for probing and inspecting the characteristics of printed semi-conductor wafers prior to dicing.

Another object of this invention is to provide a production probe instrument which is adopted to rapidly scan and inspect a large purality of undiced semi-conductor wafers without causing unintentional damage to the individual elements during testing, but permitting equally rapid deliberate obliteration of defective elements where they fail to meet prescribed control standards.

Another object of this invention is to provide a production probe instrument for testing and inspecting semi-conductor wafers where there is no 'walk" or "scrub" of the electrode contacting members such as could otherwise cause damage or give erroneous electrical readings.

Another object of this invention is to p rovide a production probe instrument for rapidly testing semi-conductor wafers and insuring accurate inspection test results.

Another object of this invention is to provide a production probe instrument for testing semi-conductor wafers which can be easily adjusted to accommodate all known varieties of electrode designs, geometry sizes and spacings.

Another object of this invention is to provide a production probe instrument for testing semi-conductor wafers without danger of contaminating or unintentionally damaging the mesas under inspection.

Other objects of this invention are to provide an improved device of the character described, that is easily and economically produced, which is sturdy in construction, and which is both highly efficient and effective in operation.

With the above and related objects in view, this invention consists in the details of construction and combination of parts as will be more fully understood from the following detailed description when read in conjunction with the following drawings in which:

FIG. 6 is a front elevational view of a probe head assembly embodied in this invention.

FIG. 7 is an exploded view of a gouging head assembly embodied in this invention.

Figure 1:
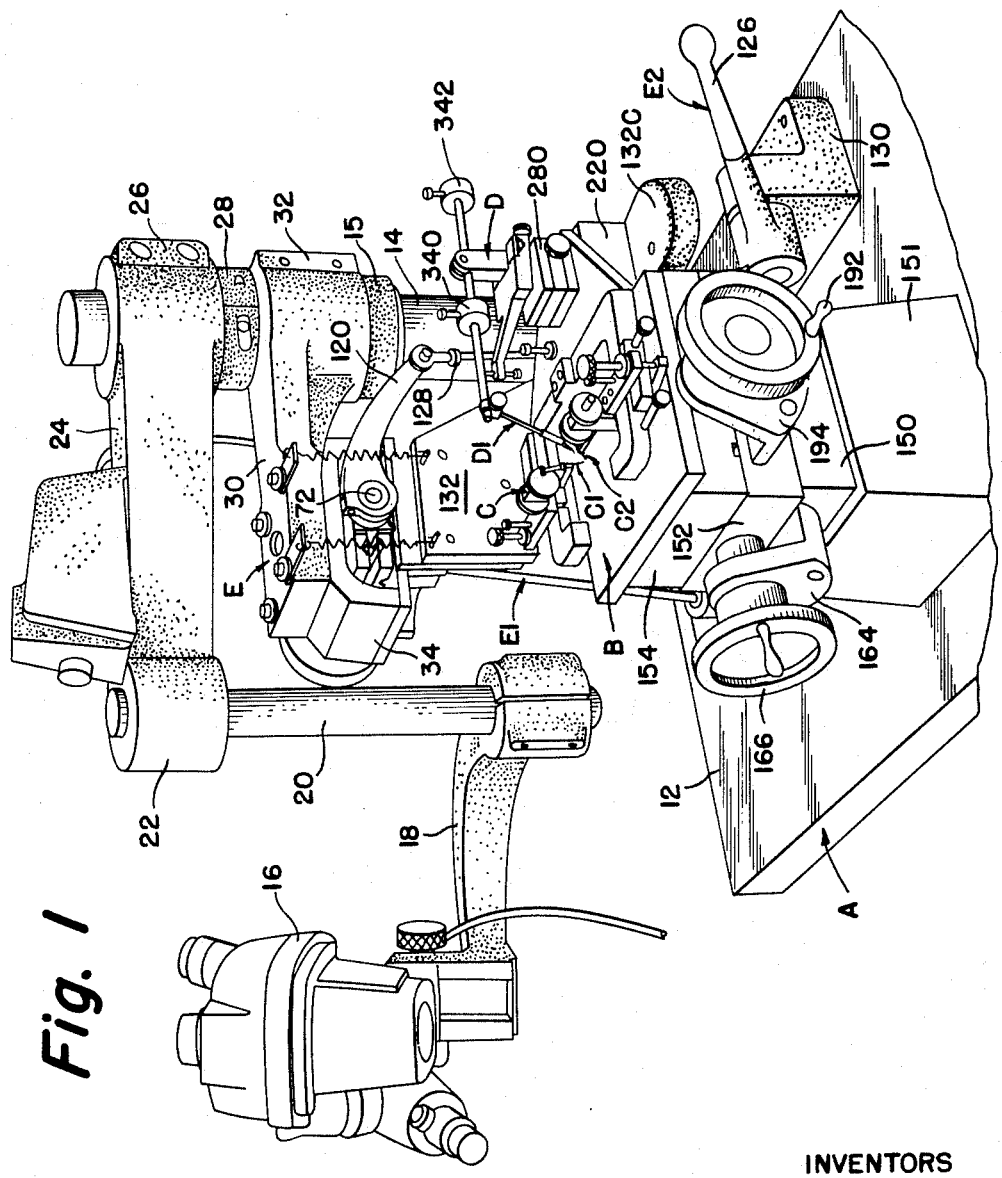
FIG. 1 is a perspective view of a semi-conductor wafer production probe instrument embodying this invention.

Referring now in greater detail to the drawings in which similar reference characters refer to similar parts, we show a production probe instrument for testing semi-conductor wafers comprising a frame, generally designated as A, a wafer slab holder pedestal B mounted upon the frame and horizontally adjustable along X- and Y-axes, a probe head, generally designated as C, a gouging head D coupled with the probe head, and a manipulator E supporting the probe head and enabling positioning thereof in three planes.

The frame A is of steel or cast iron construction and comprises a base 12 having a vertical post 14 secured thereto. As seen from FIG. 1, the manipulator E is mounted to the post 14 and is adjusted to the desired vertical elevation by collar 15. A stereo microscope 16 is adjustably supported within pod bracket arm 18 which rotatably supported in a horizontal plane upon the lower portion of downwardly depending rod 20. The upper portion of the rod 20 is held within a split clamp 22 integrally formed at one end of support arm 24, the other end of the support arm embracing the upper portion of the post 14 by split clamp 26. A clamping collar 28 adjustably mounted about post 14 below clamp 26 lends support to the arm 24 and facilitates the orientation of the microscope 16 and its rather bulky suspension members. The microscope 16 is preferably oriented so that a 45° angle exists between the axis of its objective and the top of the pedestal B, the working distance of the microscope being approximately 4 inches thereabove. An illuminator (not shown) is adjustably coupled to the microscope 16 and swings therewith about the depending rod 20 so that an operator may easily observe the wafer slab F mounted at the top of the pedestal B and make the necessary orientations in the manipulator E to position the probe head C precisely with respect to the slab F printed electrodes as will be more fully described hereinafter. The microscope 16 is also free to be pivoted out of the way when, for example, set-up adjustments are required to be made in the probe head C or the gouging head D.

As shown in FIG. 1, the manipulator E is mounted to the vertical post 14 by a bracket member 30, and after vertically adjusted by collar 15 or the post, it is secured positively thereto by clamp 32. All fine horizontal manipulation of the probe head C and correspondingly the gouging head D is accomplished by hand orienting a "chessman" or "joystick" E1 while the probing tips C1 and gouging tip D1 are under microscopic observation immediately above the wafer slab F. The probe tips C1 are downwardly urged into contact with the electrode stripes on the wafer F by partially depressing vertical actuating member E2. The gouging tip D1 is downwardly urged into obliterative engagement with the wafer F by fully depressing the vertical actuator E2 at which time the probe tips C1 are elevated entirely out of engagement with the wafer F and its electrode stripes.

Figure 4:
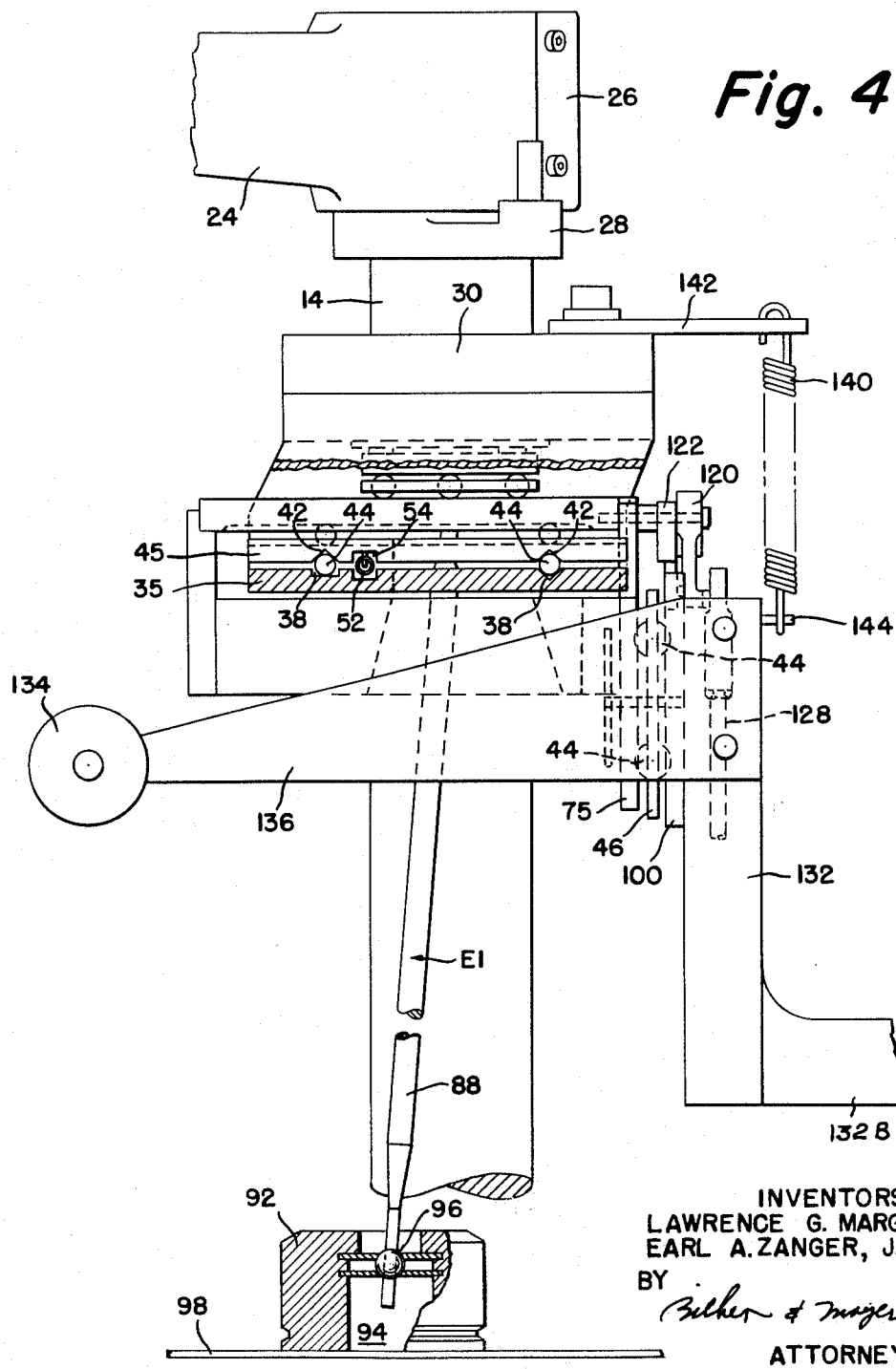
FIG. 4 is a front elevational view of a manipulator assembly embodied in this invention.
Figure 5:
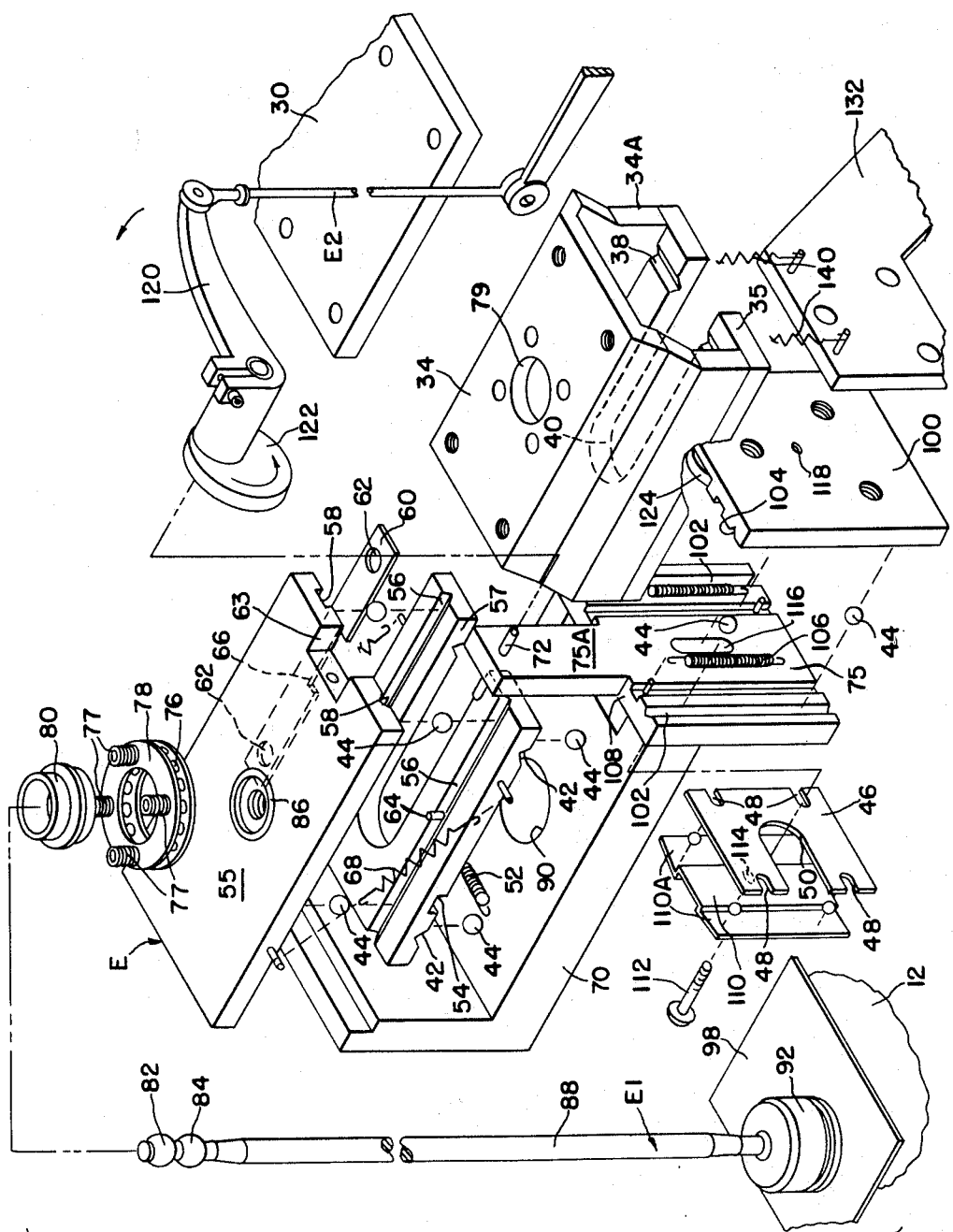
FIG. 5 is an exploded view of the manipulator assembly.

Referring now particularly to FIGS. 4 and 5, an inverted U-shaped yoke 34 is bolted to the under forward end of the support member 30. Secured to the bottom of the downwardly depending legs 34A of the yoke 34 is a guideway plate 35 having a pair of spaced parallel V-grooves or raceway tracks 38 in the upper surface thereof. One side of the guideway 35 is relieved at 40 to provide clearance for a vertical guideway plate 75 as will be more apparent hereinafter. A first stage or X-axis slider 45 having spaced parallel raceways 42 in the lower surface thereof complementary with the grooves 38 is slidable on the guideway 35 on balls 44. A ball separator 46 of thin sheet metal and having four notches 48 rides intermediate the guideway 35 and the slider 45 to retain the balls 44 in longitudinally spaced relationship. The longitudinal displacement of the ball separator 46 with respect to the complementary raceways 38 and 42 is limited by the edges of indent 50 through which the joystick E1 extends. The lateral displacement of the ball separator 46 with respect to the complementary raceways is restricted by the balls 44 trapped within the notches 48. Tension springs 52 mounted within complementary slots 54 and secured to the left hand edge of the guideway 35 and the right hand edge of slider 45 resiliently bias the X-axis slider toward the left as shown in FIG. 5 or toward the reader out of the plane of the paper as shown in FIG. 4. The upper surface of the X-axis slider 45 has a pair of spaced parallel raceways 56 extending transversely to the raceways 42.

A second stage or Y-axis slider 55 having spaced parallel raceways 58 complementary with the raceways 56 is slidable on the first stage X-axis slider 45 over balls 44, but in a direction perpendicular to the movement of the latter. Ball separators 60 of thin sheet metal having longitudinally spaced openings 62 encircling respective balls each retains the balls of a pair in longitudinal spacing from each other. The separators 60 ride intermediate the X- and Y-axis sliders and are themselves restrained in position by pins 64 upwardly extending from slots 56 and engaging notches 66. The forward edge of the first stage slider 55 is relieved at 57 to provide clearance for the fixed vertical guideway 75; the forward edge of the second stage slide being recessed at 63 to receive tongue 75A of said guideway. Springs 68 mounted in tension between each left hand outboard edge of the Y-axis slider 55 and each right hand outboard edge of the X-axis slider 45 biases the second stage slider from left to right as shown in FIG. 4. Downwardly extending from the left hand edge of the second stage slider 55 and movable therewith is an L-shaped truss 70 having a horizontal portion spaced below and not interfering in any way with the horizontal guideway plate 35. The right hand edge of the horizontal portion of the truss 70, as shown in FIG. 5, is secured to the back face of the vertical guideway 75. The tongue 75A of the guideway 75 freely extends through reliefs 40 and 57 and is affixed to the second stage slider 55 within the recess 63 by stud pin 72 whereby the legs 34A of the yoke 34 bracket but do not interfere in any way with the vertical portion of the L-shaped truss 70 nor the vertical guideway 75. It is thus easily seen that the horizontal positioning of a point on the vertical guideway will follow the horizontal orientation of the second stage slider 55, the manipulation of which will now be described.

As shown in FIG. 5, an annular thrust bearing 76 has circumferentially disposed balls which roll upon the upper surface of the second stage slider 55. Circumferentially spaced springs 77 pocketed within corresponding blind holes in the right portion of the yoke 34 compressively bear down upon annular ring member 78 seated on the thrust bearing 76 to preload the X- and Y-axis sliders toward the horizontal guideway 35 and in a direction perpendicular to their slidability.

Centrally secured within an opening 79 in the right portion of the yoke 34 is a bushing 80 in which is snapped a heim or swivel bearing 82. The heim swivel bearing 82 is an oblated ball with a bore axially extending therethrough, the ball being encapsulated within a complementary race and peripherally rotatable therein. A second heim swivel bearing 84 is snapped within opening 86 centrally disposed within the second stage silder 55.

The joystick "chessman" E1 comprises a rod 88 having the upper end thereof secured within the ball bore of the upper swivel bearing 82. The rod 88 is also slidably retained within the ball bore of the swivel bearing 84 mounted in the second stage or Y-axis slider 55. The joystick E1 projects downwardly through relief openings 57 and 40 respectively and thereafter freely extends through aperture 90 in the horizontal portion of the truss 70 toward the base 12 where it is coupled with a circular shoe 92. The shoe 92 has a vertically extending central bore 94 in which is snapped a third swivel bearing 96. The lower end of the "joystick" rod 88 slidably extends through the ball core of the bearing 96 in a manner substantially similar to the swivel bearing 84 and freely projects into the bore 94. The shoe 92 is slidably supported on a plastic sheet or pad 98 resting on the upper surface of the base 12. The pad 98 may be made of a suitable plastic composition such as a phenolic resin material. The friction between the sole of the shoe 92 and the pad 98 (i.e., the weight of the shoe times the coefficient of sliding friction) counteracts the forces of the preloading springs 52 and 68 which bias the first stage slider 45 and the second stage slider 55 respectively in a predetermined direction. Thus, the operator by resting the heel of his own hand on the base 12 and with his fingers moving the circular shoe 92 about the surface of the pad 98 will "feel" the forces of the slider biasing springs 52 and 68 thereby affording great sensitivity during manipulation. It is to be observed that the constrained slider raceways in the X-direction and the Y-direction translates the movement of the shoe 92 through the rod 88 directly into X- and Y-axes respectively with no degree of freedom rotationally. The preferential direction preloading springs 52 and 68 eliminate backlash and lost motion from the swivel joints 82 and 84 so that movement or manipulation of the shoe 92 in any direction is transmitted directly into a proportionally reduced movement in the same direction at the second stage slider 55

The vertical guideway 75, as has been described hereinbefore, moves horizontally only with movement of the "chessman" E1, but in addition defines a plane for vertical movement of Z-axis slider 100. Similar to the horizontal guideway 35, the vertical guideway has a pair of longitudinally extending, spaced parallel raceways 102 in the outboard face thereof. Complementary raceways 104 are found in the Z-axis slider 100 so that the latter may slide vertically on pairs of balls 44 retained between the opposed raceways. Suitable ball separators 46 or 60 maintain the ball pairs 44 in spaced relationship. Tension springs 106 bias the slider vertically upward. The inboard face of the guideway 75 also has a pair of spaced parallel trackways 108 which run in the same direction as the raceways 102. A leaf spring 110 substantially W-shaped in cross-section has a pair of resilient wings 110A which are complementary with the trackways 108. Ball separator 46 again retains ball pairs 44 riding in each trackway 108 longitudinally spaced from each other. The leaf spring 110 is resiliently urged toward the vertical guideway 75 by the stud 112 whose head abuts the surface of the spring and whose neck passes through aperture 114, through elongated slot 116 in the guideway 75 and thereafter threadedly engages tapped hole 118 in the Z-axis slider 100. Thus, the Z-axis slider 100 is resiliently biased against the vertical guideway 75 in a direction perpendicular to its plane of movement, and the leaf spring 110 will glide vertically with the vertical movement of the Z-axis slider which movement is limited by the upper and lower edges of the slot 116 engaging the neck of the stud 112.

The Z-axis actuator E2 comprises a crank 120 rotatably supported on stud pin 72 extending from the tongue 75A of vertical guideway 75. An eccentric or cam 122 is affixed to the crank 120 and is rotatable therewith. The cam 122 bears against a roller 124 supported at the upper edge of the Z-axis slider 100 as a result of the biasing effect of springs 106 which constantly urge and preload the Z-axis slider into abutment with the eccentric cam. Partial counterclockwise rotation of the crank 120 as shown in FIG. 5 will correspondingly cause comparable counterclockwise rotation of the cam 122, and the eccentricity of the cam bearing on roller 124 will necessarily force the Z-axis slider 100 vertically downward. The end of the crank 120 is coupled to one end of actuator lever arm 126 through tie rod 128. As seen from FIG. 1, the actuating lever 126 is pivotally mounted in block 130 affixed to the base 12. Thus, by hand depressing the lever 126, the Z-axis slider 100 will be accordingly depressed.

Referring now to FIG. 4, a probe head carrying support 132, which is essentially an L-shaped bracket, is bolted to the face of Z-axis slider 100 and is vertically reciprocable therewith. The bracket 132 is also capable of being oriented horizontally by manipulation of the "chessman" E1. However, since the support bracket 132 carries an appreciable load, i.e., the weight of the probe head C and the gouging head D, at a distance relatively far removed from the affixation thereof to the Z-axis slider 100, a considerable moment or torque load is imposed upon all of the manipulating sliders. In order to counteract this moment, counterweights 134 are hung upon arm 136 secured to the support bracket 132. Thus, the opposing moment of the counterweights 134 and arm 136 equalizes the natural torque exerted by the horizontal portion of bracket 132 and the load exerted by the weight of the probe and gouging heads at the opposite end thereof. In addition, because of the weight of the support 132, the probe and gouging heads C and D, the arm 136 and the counterweights 134, auxiliary tension springs 140 are hung from hanger 142 secured to the top bracket member 30 and are mounted upon pins 144 extending from the support 132. Thus, the auxiliary springs 140 assist the Z-axis slider springs 106 in biasing the slider against the cam 122.

Figure 2:
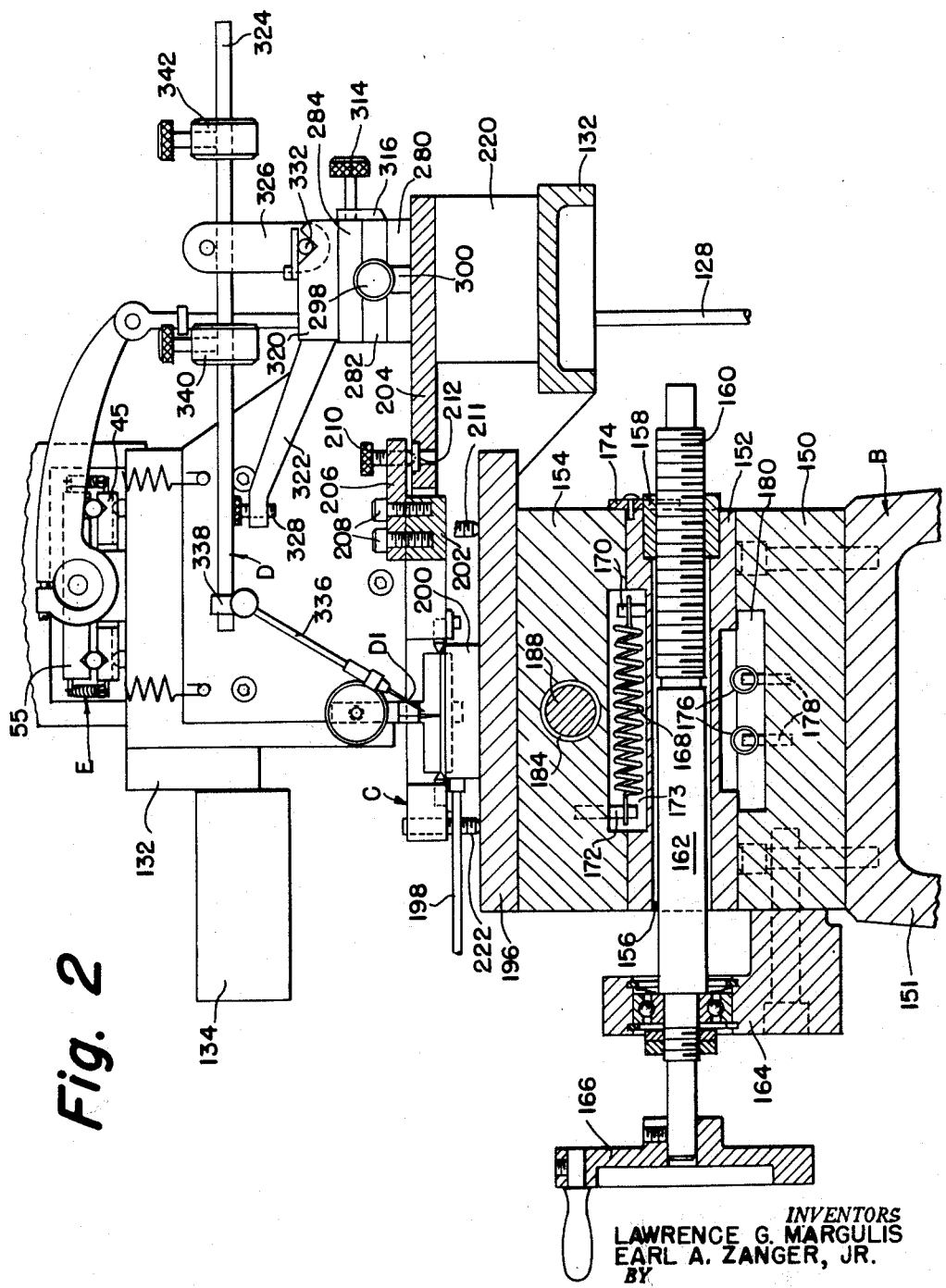
FIG. 2 is side elevational view thereof.
Figure 3:
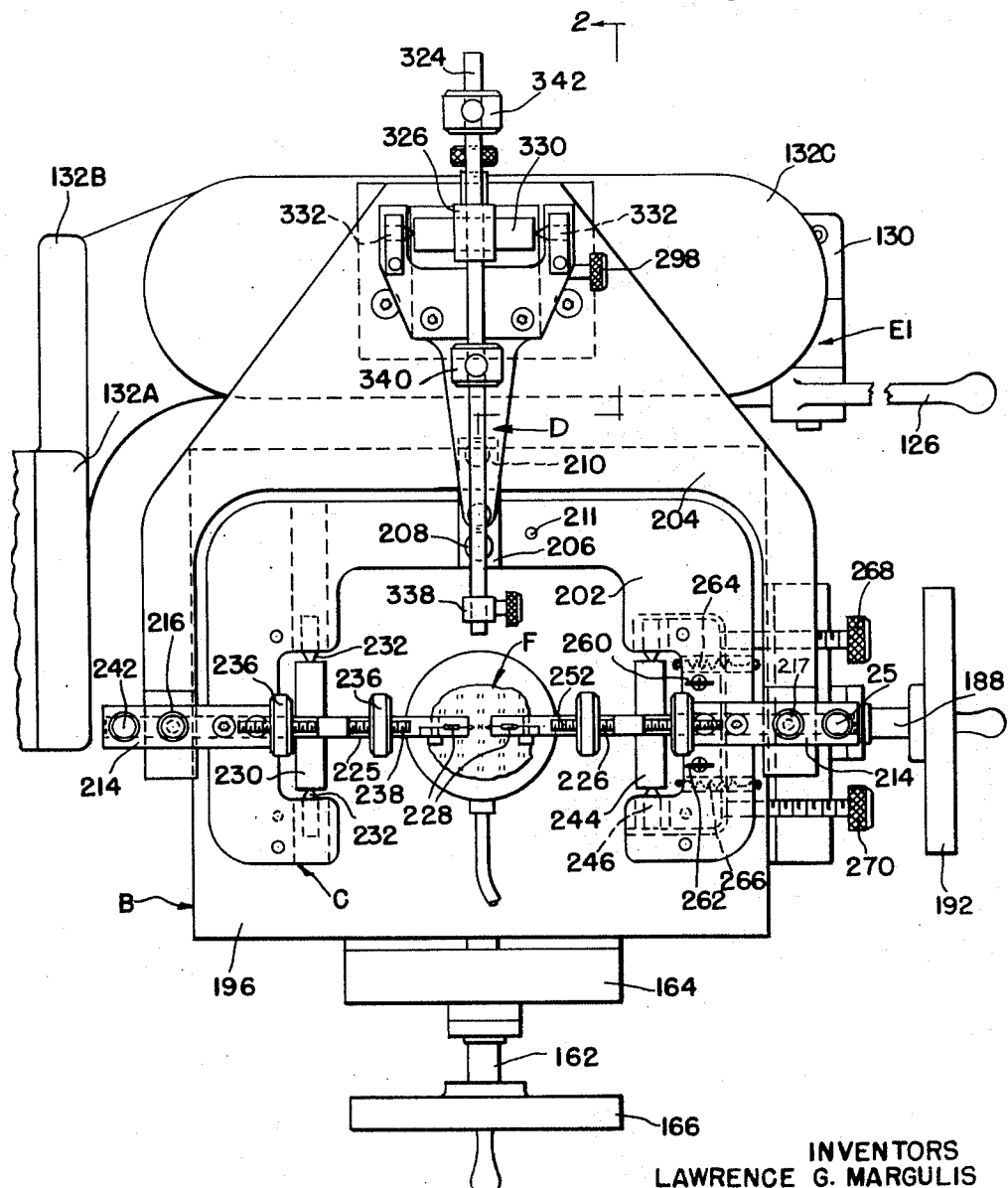
FIG. 3 is a top plan view thereof.

Referring to FIGS. 3 and 6, the pedestal B comprises a fixed plate member 150 affixed to the base 12 by a platform 151, a plate 152 slidable along an X-axis on the fixed plate member, and a second plate 154 slidable along a Y-axis on the first plate 152. Plate 152 has a horizontal bore 156 extending therethrough with an internally threaded bushing 158 affixed at one end. A shaft 162 having a lead screw 160 at one end extends through the bore 156 so that the lead screw is threadedly engaged within the bushing 158. The other end of the shaft 162 is journaled within a bearing bracket 164 secured to the front of the fixed plate member 150, and a handwheel 166 provides the means for turning the lead screw 160 so that the plate 152 may be moved in either direction along the X-axis. Biasing springs 168 hung from pins 170 upwardly extending from the plate 152 and pins 172 downwardly extending from plate 154 within passageway 173 therebetween maintain the latter plate in slidable abutment with a guide stop 174 at the right hand edge of the plate 152 as shown in FIG. 2. Similarly, tension springs 176 hung upon pins 178 upwardly extending from the fixed plate member 150 and pins (not shown) downwardly extending from plate 152 within guideway 180 force the latter plate into slidable abutment with a stop guide 182 affixed to the left hand edge of plate 150 as shown in FIG. 6. The Y-axis plate 154 has a bore 184 through which lead screw 186 and shaft 188 extend, the screw threadedly engaging an internally threaded bushing 190 which is affixed to the left hand edge of plate 154 adjacent the end of the bore 184. The shaft 188 has a handwheel 192 secured to one end and is journaled within a bearing bracket 194 mounted upon X-axis plate 152. Thus, the X-axis plate 152 is laterally movable by handwheel 166 in and out of the plane of the paper as shown in FIG. 6 and is biased by springs 176 to the left. Correspondingly, the Y-axis plate 154 is longitudinally movable by handwheel 192 in and out of the paper as shown in FIG. 2 and is biased by springs 168 to the right. It is to be observed that the springs 168 and 176 may move out of a pure X- and Y-axis as the lateral and longitudinal positions of the plates 152 and 154 are adjusted. A hardened ground and lapped cover plate 196 over which the probe head C slides is secured to the upper surface of Y-axis plate 154. A vacuum chuck plate 200 is magnetically mounted upon the cover plate 196 and holds down the wafer F by a suction applied through tubing 198 communicating with a plurality of small holes (not shown) in the top face of the chuck. The pedestal B is used for gross positioning of the probe tips C1 and C2, each complete revolution of either handwheel 166 or 192 moving the cover plate 196 0.025 inch along the X- or Y-axis respectively.

After the probe tips C1 and C2 have been coarsely adjusted over the particular conductor indicia on the wafer F by means of the handwheels 166 and 192, the manipulator E through joystick chessman E1 is used for fine adjustment. The probe head C comprises a U-shaped support 202, as shown in FIG. 3, which rests upon a yoke 204. A strap 206 is secured to the medial portion of the bight of the support 202 by machine screws 208 and a thumb screw 210 threaded in the strap has its tapered tip seated upon a concave button 212. Lateral straps 214 are secured to the sides of the support 202 by machine screws 215 and have thumb adjusting screws 216 and 217 threadedly engaged within the straps and resting upon concave buttons 218 mounted within the arms of the yoke 204. Thus, the head support 202 is triangularly mounted through the tripod toes of the thumbscrews 210, 216 and 217 resting on buttons 212 and 218 respectively. The yoke 204 itself is screwed to block 220 which is affixed upon the bracket support 132 orientable in three planes by the manipulator E.

Studs 222 and 223 are threadedly engaged within the sides of the U-shaped support 202 adjacent the forward edges thereof and stud 211 from its bight so that all downwardly depend to act as resting feet upon the cover plate 196. The probe tips C1 and C2 are respectively supported within pivot arms 225 and 226 by clamp holders 228. Arm 225 is affixed to trunnion 230 pivotally supported at its conically countersunk ends by tapered points 232 mounted within head support grooves 234. Counterweights 236 are adjusted on threaded rod 238 affixed to ear 240 so that the outboard end of the arm 225 is urged upwardly into abutment with thumbscrew 242 threaded within strap 214. See FIG. 6. Arm 226 is an adjustable arm and has a trunnion 244 pivotally supported at its ends by conical point bearings 246 mounted within adjusting link 248. Counterweights 250 are adjusted on threaded rod 252 mounted on ear 254 so that the outboard end of arm 226 is upwardly urged into abutment with thumbscrew 256 threaded within right hand strap 214. It is also to be observed that the load which the tips C1 and C2 exert upon the wafer F when the Z-actuating arm E2 is depressed is adjusted by the position of the counterweights 236 and 250 on their respective threaded rods 238 and 252.

The link 248 is coupled to the underside of the right hand side of the U-shaped support 202 by vertical springs 260 and 262. Horizontal springs 264 and 266 bias the link 248 against adjusting screws 268 and 270 threadedly engaged within the right hand side of the support 202. Thus, the link 248 is effectively pivotally suspended so that by movement of either screw 268 or 270 the probe tip C2 can be swung in an arc for alignment along the X-axis with probe tip C1. By movement of both screws 268 and 270 simultaneously, the spacing between the tips C1 and C2 can be adjusted to suit the spacing of the electrode pairs printed on the wafer F. The tips C1 and C2 are preferably tungsten for hardness and conductivity. Lead wires 274 and 276 extend to external testing circuitry or instruments (not shown) for measuring the characteristics of the components under inspection.

Referring now to FIGS. 2, 3, and 7, the gouging head D comprises a base stage 280 secured to the top of the block 220, a first stage 282 slidable on the base 280 along Y-axis, and a second stage 284 slidable on the first stage along an X-axis. The overall effect of the stages 280, 282, 284 is substantially the same as the head slider plates 150, 152 and 154 and the manipulator sliders 35, 45, 55, although the construction and manner of operation differ in some respects. The base stage 280 is recessed longitudinally to define a pair of elevated tracks 279 on each side. See FIG. 7. The under-surface of the first stage is recessed longitudinally to define a pair of tracks 281 which slidably glide on the tracks 279. Guides 288 and 289 are attached to the edges of base stage 280 and restrain the lateral movement of the first stage 282. Tension springs 290 extending through elongated slots 292 in the base 280 and slots 294 in the first stage 282 are hooked upon hanger pins 295 extending across the base and across the top of the first stage. A biasing spring 296 urges the first stage 282 against Y-axis adjusting screw 298 threaded in bracket 300 vertically secured to the base. The end of the screw 298 abuts against a hardened steel button 302 secured within the notched leading edge of the first stage 282.

The upper surface of the first stage is laterally recessed at right angles to the recess in its lower surface to define a pair of elevated tracks 283. The lower surface of the second stage 284 is recessed to define a pair of tracks 285 which slidably slide upon the tracks 283. Guides 305 and 306 are secured to the lateral edges of the first stage 282 and restrain the transverse movement of the second stage 284. Tension springs 308 extending through elongated slots 310 in the first stage and slots 312 in the second stage are hooked upon hanger pins 295 so that the first stage 282 is resiliently compressed and sandwiched between the base 280 and the second stage 284. A biasing spring 299 hung upon pins 311 and 313 urges the second stage 284 into abutment with X-axis adjusting screw 314 threaded within bracket 316 mounted upon the first stage.

A gouger support 320 is secured to the second stage 284 and has a forwardly extending leg 322 integrally extending therefrom. A gouger pivot rod 324 adjustably mounted within holder 326 has its forward portion resting upon seat screw 328 adjustably threaded within the leg 322. The holder 326 is fixed upon a trunnion 330 which is hingedly retained by concavely countersunk ends within tapered points 332. The points are strapped within grooves 334 in the upper surface of the support 320.

The gouger tip D1 has a diamond point which is held in a quill 336 adjustably suspended from pivot rod 324 by bracket clamp 338. Counterweights 340 and 342 are slidably adjustable on the rod 324 to vary the load exerted by the gouger tip D1 as desired and as will now be described.

After placing a wafer slab F or having a plurality of printed electrodes thereon, i.e., stripe pairs, bulls-eyes, etc., in the vacuum chuck 200 the operator while looking through the microscope, lowers the Z-axis actuator E2 by depressing handle 126 so that the probe tips C1 and C2 just touch the slab. The actuator E2 is then raised so that the tips are just clear of the wafer F. Using the two hand wheels 166 and 192 as coarse positioners and the manipulator E1 as a fine adjustment, a set of electrodes is placed directly under the probe tips C1 and C2. While still under microscopic observation the probe tips are adjusted for spacing by turning the thumbscrews 268 and 270 in the same direction until the distance between the tips is identical to the spacing between a wafer electrode pair. If the tips are not aligned along the Y-axis, one or the other thumbscrew 268 or 270 may be turned to pivot the link 248 with the Z-actuator E2 in its uppermost position, either thumbscrew 242 or 256 is adjusted to obtain proper vertical alignment of the probe tips C1 and C2.

In order to adjust the force of the points C1 and C2, the Z-actuator E2 is depressed to the bottom of its stroke and observation is made as to whether the printed electrodes on the wafer F have been peened. This force is balanced by varying the position of the counterweights 236 and 250. Moving either of the counterweights 236 or 250 inboard increases the load or conversely moving these counterweights outboard reduces the loading pressure of the points.

It is to be observed that as the probe tips engage the wafer, the pivot arms 225 and 226 hinge upwardly (a few thousandths of an inch) at their inboard ends, the outboard ends rotating slightly off from adjusting screws 242 and 256. In order to avoid "scrub" or "walk" of the probe tips C1 and C2 across the wafer printed electrodes which would result from excessive pivoting of the arms 225 and 226, feet 211, 222 and 223, and leveling screws 210, 216 and 217 are adjusted with feeler gauges so that the vertical movement of the tips does not exceed .005 inch or approximately the thickness of the wafer. This pivoting occurs as the yoke 204 is lowered sufficiently to enable the feet 211, 222 and 223 to engage the table as the leveling screws 210, 216 and 217 no longer are carried by the buttons 212 and 218 respectively. It also may be easily seen from the phantom lines in FIG. 6, that further depression of the Z-actuator E2 will cause the bifurcated ends of the yoke 204 to engage against the outboard ends of the pivot arms 225 and 226 so as to rotate the tips C1 and C2 vertically out of contact with the wafer. At this stage of the operation, the goucher tip D1 will be forced into engagement with the wafer F as described immediately herein below.

The goucher or scratcher tip D1 is centered between the probe tips C1 and C2 and slightly to the rear thereof. This is accomplished by adjustment of the eradicating head stages 282 and 284 through thumbscrews 298 and 300. Coarse adjustment of gouger tip height and angle is made by positioning quill 336 in bracket clamp 338 whereas fine positioning is made by adjustment of the rest 328.

After inspection of the various electrode pairs through the use of the probe tips C1 and C2 has occurred, any defective electrode pairs can be obliterated by one of two methods. The first method is to depress fully the Z-actuator E2 and gouging a deep scratch into the wafer F at the center point of an electrode pair. This is performed by placing the weights 340 and 342 forward of the pivot center 332. The exact position is determined experimentally. The second method of eradicating an unwanted set of electrodes is to depress the Z-actuator E2 fully as before with the weights 340 and 342 on opposite sides of the pivot center as shown in FIG. 2, and using the joystick manipulator E1 to scratch out the indicia. The latter method employs a very light force whose weight, again, is determined experimentally.

In summary, it is to be indicated that the probe head C uses a support 202 which rests in triangulated self-centering position by screws 210, 216 and 217 seated upon countersunk buttons 212 and 218 respectively within the yoke 204. The probe tips C1 and C2 first engage the wafer slab F when the Z-actuator E2 is partially depressed (i.e., approximately a horizontal position). The pivot arms 225 and 226 upwardly rotate very slightly as the legs 211, 222 and 223 touch down on the cover plate 196. The force exerted by the tips C1 and C2 on the wafer electrodes at this stage is controlled by the position of the counterweights 236 and 250. As the Z-actuator E2 is fully depressed when a defective set of electrodes appears, the bifurcated ends of the yoke 204 downwardly engage the outboard ends of the pivot arms 225 and 226. The probe tips C1 and C2 will swing upwardly and the gouger tip D1 will be urged downwardly into contact with the wafer to obliterate the defective electrodes by one of the two methods described hereinbefore.

Although this invention has been described in considerable detail, such description is intended as being illustrative rather than limiting since the invention may be variously embodied and the scope of the invention is to be determined as claimed.

What is claimed is:

1. A production probe instrument for inspecting semiconductor wafers having surface electrodes thereon, comprising a frame, a probe head coupled to said frame, means to orient said probe head about X-, and Y- and Z-axes therein, probe tips depending from said head, means to manipulate said probe head within a fixed horizontal plane in adjacently spaced hovering disposition above the wafer surface until said probe tips register with the respective surface electrodes spaced therebelow, and means to depress said probe head to a predetermined first level at which said probe tips are urged into non-destructive contact with the respective surface electrodes and bear thereagainst with substantially constant force.

2. The invention of claim 1 including gouging means coupled with said probe head, means to depress said probe head below the first level to a second level at which said gouging means obliteratively engages the wafer surfaces, and means actuated by the depression of said probe head below the first level withdrawing each of said tips out of contact with the wafer surface.

3. A production probe instrument for inspecting semiconductor wafers having surface electrodes thereon, comprising a frame, a pedestal coarsely manipulatable along respective horizontal X- and Y-axes in said frame, a probe head, hand manipulating means in said frame supporting and finely positioning said probe head along horizontal X- and Y-axes simultaneously above the wafer being inspected, probe means on said probe head, gouging means coupled with said probe head and horizontally oriented therewith, actuating means for depressing said probe head to a first level at which said probe means are urged into non-destructive contact with the wafer electrodes and then to a second level therebelow at which said gouging means are urged into obliterative engagement with defective wafers, and means actuated by the depression of said probe head below the first level withdrawing said probe means out of engagement with the wafer.

4. A production probe instrument for inspecting semiconductor wafers having a plurality of surface electrodes thereon, comprising a frame, a probe head, manipulator means in said frame for hand positioning said probe head along horizontal X- and Y-axes above the wafer and into registration with each set of surface electrodes, said probe head including a yoke secured to said manipulator means and movable therewith, a self-centering support freely resting upon said yoke, spaced probe tips pivotally supported on said support, and actuator means for depressing said yoke to detachably release said support upon said frame and thereby non-destructively pivotally engaging said probe tips upon the respective electrodes.

5. The invention of claim 4 wherein adjusting means are mounted within said probe head for aligning the spacing of said tips with the spacing of the surface electrodes.

6. The invention of claim 5 wherein counterweight means on said pivot arms may be adjusted to vary the load applied by said tips upon the surface electrodes.

7. The invention of claim 4 including gouging means positionable horizontally with said probe head, and means for further depressing said yoke below the level at which said support is released and urging said gouging tip into obliterative engagement with the wafer surface.

8. The invention of claim 7 wherein said gouging means comprises an arm pivotally supported upon said yoke, and a gouging tip extending from said arm normally spaced above the vertical position of said probe tips, and means on said yoke actuated by the further depression thereof pivotally swinging the probe tips out of engagement with the surface electrodes before said gouging tip makes contact therewith.

9. The invention of claim 8 wherein counterweight means on said gouging arm may be adjusted to vary the pressure applied by said gouging tip.

10. The invention of claim 9 wherein said gouging tip is independently adjustable with respect to the probe tips.

11. A production probe instrument for inspecting semiconductor wafers having surface electrodes thereon comprising means for supporting the wafers, probe means registrable with the surface electrodes, gouging means coupled with said probe means and adjacently spaced thereabove, reciprocable means for depressing said probe means to a predetermined first level at which said probe means are urged into non-destructive contact with the surface electrodes and then to a second level therebelow at which said gouging means are urged into obliterative engagement with the surface electrodes, and means actuated by the depression of said reciprocable means below the first level elevating said probe means out of engagement with the wafer.

12. The invention of claim 11 wherein said probe means comprises at least one tip pivotally supported about a horizontal axis above the wafer.

13. The invention of claim 11 wherein said gouging means comprises a pivotally supported scribing tip.

14. The invention of claim 12 wherein adjustable loading means are coupled with said probe means so that the force applied by said tips upon the surface electrodes may be varied.

15. The invention of claim 13 wherein adjustable loading means are coupled with said gouging means so that the force applied by said scribing tip upon the surface electrodes may be varied.

16. A production probe instrument for inspecting semiconductor wafers having surface electrodes thereon comprising a frame, platen means for supporting the wafers, vertically reciprocable means in said frame, a support member carried by and freely resting upon said reciprocable means, probe means pivotally mounted in said support member, means restraining said probe means from pivoting below a predetermined horizontal axis therein, and means for depressing said reciprocable means to a first level at which said support member is detachably transferred from said reciprocable means to said platen means and rests freely thereon to urge said probe means pivotally into non-destructive contact with the surface electrodes whereby scrubbing and peening actions are eliminated.

17. The invention of claim 16 including gouging means coupled with said reciprocable means, means to depress said reciprocable means to a second level at which said gouging means are urged into obliterative engagement with the wafer surface, and means actuated by the depression of said reciprocable means below the first level pivotally elevating said probe means from engagement with the wafer.

18. The invention of claim 17 wherein adjustable loading means are coupled respectively with said probe and said gouging means so that the force applied by each of said means may be varied upon the surface electrodes.

19. A production probe instrument for inspecting semiconductor wafers having surface electrodes thereon comprising a frame, a wafer platen, a support member, vertically reciprocable means detachably carrying said support member in said frame above said platen, probe means coupled with said support member, and actuator means for depressing said reciprocable means to a first level at which said support member is transferred therefrom to said platen to urge said probe means into engagement upon the surface electrodes with a predetermined loading force.

20. The invention of claim 19 including gouging means coupled with said reciprocable means, means for further depressing said reciprocable means to a second level at which said gouging means are actuated into obliterative engagement with defective wafers, and means to disengage said probe means from said wafer with actuation of said gouging means.

21. A probe instrument for inspecting semiconductor wafers having surface electrodes comprising a frame, a chuck supporting a wafer to be tested, a probe head vertically reciprocable in said frame above said chuck, a probe tip hingedly depending from said head and restrained from pivoting below a predetermined horizontal axis, a gouging tip supported in said head adjacent said probe tip, means to depress said head so that first said probe tip and then said gouging tip are urged into abutment with said wafer, and means actuated by the depression of said probe head below a predetermined level pivotally withdrawing said probe tip out of engagement with said wafer before said gouging tip engages therewith.

22. A probe instrument for inspecting semiconductor wafers having discrete zones of surface electrodes arranged thereon in regular rows and files comprising a frame, a chuck supporting a wafer to be tested, a probe head vertically reciprocable in said frame, probe means depending from said head, means for orienting said chuck in a horizontal plane until one zone of electrodes at a time is grossly positioned under said probe means, means for finely positioning said head in a fixed horizontal plane adjacently spaced above the wafer until said probe means are in registration with the electrodes, means to depress said probe head to a first level at which said probe means are urged into non-destructive contact with the electrodes in registration therewith, gouging means coupled with said probe head and normally spaced above said probe means, and means to depress said probe head below the first level to a second level at which said gouging means are urged into obliterative engagement with a zone of electrodes indicated to be defective by said probe means.

23. The invention of claim 22 including means for elevating said probe means out of engagement with the electrodes intermediate said first and second levels.

24. A probe instrument for inspecting semiconductor wafers having discrete zones of surface electrodes arranged thereon in regularly defined rows and files comprising a frame, a probe head, reciprocable means detachably supporting said probe head in said frame, probe means depending from said probe head, a chuck supporting a wafer to be tested, means for manipulating said chuck along horizontal X- and Y-axes to grossly position one zone at a time under said probe means, hovering means for manipulating said probe head in a fixed horizontal plane adjacently spaced above the wafer surface until said probe means are in spaced registration with the respective underlying electrodes, and means to depress said reciprocable means to a first level at which said probe head is transferred from said reciprocable means to said chuck to rest freely thereon and urge said probe means into non-destructive contact upon the underlying electrodes with substantially constant force.

25. The invention of claim 24 wherein said probe means comprise a pair of spaced tips, means hingedly supporting said tips about respective horizontal axes in said probe head, and means restraining said tips from pivoting below a predetermined horizontal axis.

26. The invention of claim 25 including adjustable means on said probe head for controlling the degree of pivotal rotation of said probe tips about their respective horizontal axes of hinged support when said tips are urged into contact with the surface electrodes at the first level whereby scrubbing action on the electrodes may be minimized.

27. The invention of claim 25 including means for adjusting the alignment and spacing of said probe tips to comply with the configuration of the wafer electrodes in said zones.

References Cited by the Examiner

UNITED STATES PATENTS

| | | | |
|---|---|---|---|
| 2,432,058 | 12/47 | Wilken et al. | 248—179 X |
| 2,748,235 | 5/56 | Wallace | 324—158 X |
| 2,748,349 | 5/56 | Dickten et al. | 324—158 |
| 2,872,645 | 2/59 | Santamaria et al. | 324—158 |
| 3,038,121 | 6/62 | Gray et al. | 324—158 X |
| 3,134,942 | 5/64 | Rhodes | 324—72.5 |

WALTER L. CARLSON, *Primary Examiner.*

SAMUEL BERNSTEIN, *Examiner.*